United States Patent
Ramasamy

(10) Patent No.: US 10,965,740 B2
(45) Date of Patent: Mar. 30, 2021

(54) METHOD AND DEVICE FOR AUTOMATICALLY MANAGING NETWORK

(71) Applicant: SAMSUNG ELECTRONICS CO., LTD., Suwon-si (KR)

(72) Inventor: Boopathi Ramasamy, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 112 days.

(21) Appl. No.: 16/097,056

(22) PCT Filed: May 8, 2017

(86) PCT No.: PCT/KR2017/004760
§ 371 (c)(1),
(2) Date: Oct. 26, 2018

(87) PCT Pub. No.: WO2017/196040
PCT Pub. Date: Nov. 16, 2017

(65) Prior Publication Data
US 2019/0158578 A1 May 23, 2019

Related U.S. Application Data

(60) Provisional application No. 62/333,419, filed on May 9, 2016.

(30) Foreign Application Priority Data

May 4, 2017 (KR) .......................... 10-2017-0056833

(51) Int. Cl.
*G06F 15/16* (2006.01)
*H04L 29/08* (2006.01)
(Continued)

(52) U.S. Cl.
CPC ........ *H04L 67/101* (2013.01); *H04L 41/0886* (2013.01); *H04L 43/16* (2013.01)

(58) Field of Classification Search
CPC ... H04L 29/08072; H04L 29/06; H04L 47/02; H04L 67/01; H04L 41/0886; H04L 43/16
(Continued)

(56) References Cited

U.S. PATENT DOCUMENTS 5,828,801 A * 10/1998 Sakamoto ........... H01S 3/06754
385/24
8,150,413 B2 * 4/2012 Aoyama ............... H04W 16/18
455/453
(Continued)

OTHER PUBLICATIONS

International Search Report dated Jul. 28, 2017, issued by the International Searching Authority in International Application No. PCT/KR2017/004750 (PCT/ISA/210).

*Primary Examiner* — Khanh Q Dinh
(74) *Attorney, Agent, or Firm* — Sughrue Mion, PLLC

(57) ABSTRACT

The present invention is a method for allowing a network system to automatically perform a configuration of a network management server without user intervention, and a method for allowing a load distribution device to manage the network management server comprises the steps of: receiving information indicating that a new base station is added to a network; transmitting the information on the new base station to at least one network management server; receiving processing time information on the new base station from the at least one network management server; and determining a network management server to which the new base station is to be allocated, on the basis of the processing time information.

8 Claims, 11 Drawing Sheets

(51) Int. Cl.
*H04L 12/24* (2006.01)
*H04L 12/26* (2006.01)

(58) Field of Classification Search
USPC ............................... 709/220, 224, 227, 228
See application file for complete search history.

(56) References Cited

U.S. PATENT DOCUMENTS

| | | | | |
|---|---|---|---|---|
| 8,996,699 | B2* | 3/2015 | Jenkins | H04L 67/42 |
| | | | | 709/226 |
| 9,154,557 | B2* | 10/2015 | Lev-Ran | H04L 67/28 |
| 9,178,789 | B2* | 11/2015 | Zhang | H04L 47/27 |
| 9,531,613 | B2* | 12/2016 | Jenkins | H04L 67/42 |
| 2003/0063594 | A1 | 4/2003 | Li et al. | |
| 2006/0189317 | A1 | 8/2006 | Nakano | |
| 2008/0225801 | A1* | 9/2008 | Turk | H04W 36/32 |
| | | | | 370/332 |
| 2009/0028045 | A1 | 1/2009 | Stellenberg et al. | |
| 2009/0280268 | A1* | 11/2009 | Glukhoy | C23C 16/509 |
| | | | | 427/578 |
| 2009/0284421 | A1* | 11/2009 | Glukhoy | H01Q 7/00 |
| | | | | 343/701 |
| 2009/0323590 | A1 | 12/2009 | Fujimoto | |
| 2012/0106346 | A1* | 5/2012 | Aguirre | H04W 28/08 |
| | | | | 370/237 |
| 2012/0314710 | A1* | 12/2012 | Shikano | H04L 47/122 |
| | | | | 370/392 |
| 2013/0150056 | A1 | 8/2013 | Yi et al. | |
| 2014/0020113 | A1* | 1/2014 | Shah | G06F 21/60 |
| | | | | 726/27 |
| 2014/0185588 | A1 | 7/2014 | Zhu et al. | |
| 2014/0301347 | A1 | 10/2014 | Nanri | |
| 2015/0220129 | A1* | 8/2015 | Miwa | G06F 9/45533 |
| | | | | 713/322 |
| 2015/0230123 | A1* | 8/2015 | Kotecha | H04L 67/1002 |
| | | | | 370/235 |
| 2017/0005898 | A1* | 1/2017 | Davis | H04L 41/0896 |
| 2017/0066322 | A1* | 3/2017 | Dudar | B60K 15/03 |

* cited by examiner

FIG. 8A

| Fixed Interval(FI) | Algorithm Execution Time | Total NE to be Monitored(M) | Completed eNB in interval | Total eNB completed (N1) | Uncompleted eNB (N2) | Uncompleted eNB in Previous Cycle N3 | Operation Efficiency Gained(O) | Operation efficiency to be Achieved(A) | Load Balancing eNB count(NA) | Operation degradation (D) | Fixed Interval(FI) | Elapsed Time(E) | Remaining Time | Load Balancing NE |
|---|---|---|---|---|---|---|---|---|---|---|---|---|---|---|
| 1 (800) | 10:01 | 10000 | 600 | 600 | 9400 | 0 | 600 | 714 | 1,000 | 10.00% | 15 | 1 | 14 | 0 |
| | 10:02 | 9400 | 630 | 1230 | 8770 | 0 | 615 | 723 | 775 | 7.75% | 15 | 2 | 13 | 0 |
| | 10:03 | 8770 | 620 | 1850 | 8150 | 0 | 617 | 731 | 750 | 7.50% | 15 | 3 | 12 | 0 |
| | 10:04 | 8150 | 644 | 2494 | 7506 | 0 | 624 | 741 | 648 | 6.48% | 15 | 4 | 11 | 0 |
| | 10:05 | 7506 | 633 | 3127 | 6873 | 0 | 625 | 751 | 619 | 6.19% | 15 | 5 | 10 | 0 |
| | 10:06 | 6873 | 643 | 3770 | 6230 | 0 | 628 | 764 | 575 | 5.75% | 15 | 6 | 9 | 0 |
| | 10:07 | 6230 | 633 | 4403 | 5597 | 0 | 629 | 779 | 565 | 5.65% | 15 | 7 | 8 | 0 |
| | 10:08 | 5597 | 620 | 5023 | 4977 | 0 | 628 | 800 | 582 | 5.82% | 15 | 8 | 7 | 0 |
| | 10:09 | 4977 | 618 | 5641 | 4359 | 0 | 627 | 830 | 598 | 5.98% | 15 | 9 | 6 | 0 |
| | 10:10 | 4359 | 625 | 6266 | 3734 | 0 | 627 | 872 | 601 | 6.01% | 15 | 10 | 5 | 0 |
| | 10:11 | 3734 | 630 | 6896 | 3104 | 0 | 627 | 934 | 596 | 5.96% | 15 | 11 | 4 | 0 |
| | 10:12 | 3104 | 640 | 7536 | 2464 | 0 | 628 | 1035 | 580 | 5.80% | 15 | 12 | 3 | 0 |
| | 10:13 | 2464 | 635 | 8171 | 1829 | 0 | 629 | 1232 | 572 | 5.72% | 15 | 13 | 2 | 0 |
| | 10:14 | 1829 | 640 | 8811 | 1189 | 0 | 629 | 1829 | 560 | 5.60% | 15 | 14 | 1 | 0 |
| | 10:15 (810) | 1189 | 633 | 9444 | 556 (812) | | 630 | | 556 | 5.56% | 15 | 15 | 0 | 0 |

FIG. 8B

| 2 (850) | | | | | | | | | | | | | | |
|---|---|---|---|---|---|---|---|---|---|---|---|---|---|---|
| 1016 | 10556 | 635 | 635 | 9921 | 556 | 635 | 754 | 1,031 | 9.77% | 15 | 1 | 14 | 0 |
| 1017 | 9921 | 599 | 1234 | 9322 | | 617 | 763 | 1,301 | 12.32% | 15 | 2 | 13 | 0 |
| 1018 | 9322 | 591 | 1825 | 8731 | | 608 | 777 | 1,431 | 13.56% | 15 | 3 | 12 | 0 |
| 1019 | 8731 | 588 | 2413 | 8143 | | 603 | 794 | 1,507 | 14.28% | 15 | 4 | 11 | 0 |
| 1020 | 8143 | 591 | 3004 | 7552 | | 601 | 814 | 1,544 | 14.63% | 15 | 5 | 10 | 0 |
| 1021 | 7552 | 599 | 3603 | 6953 | | 601 | 839 | 1,549 | 14.67% | 15 | 6 | 9 | 0 |
| 1022 | 6953 | 593 | 4196 | 6360 | | 599 | 869 | 1,565 | 14.82% | 15 | 7 | 8 | 0 |
| 1023 | 6360 | 588 | 4784 | 5772 | | 598 | 909 | 1,586 | 15.02% | 15 | 8 | 7 | 0 |
| 1024 | 5772 | 594 | 5378 | 5178 | | 588 | 962 | 1,593 | 15.09% | 15 | 9 | 6 | 0 |
| 1025 (860) | 5178 | 588 | 5966 | 4590 | | 597 | 1036 | 1,607 | 15.22% (862) | 15 | 10 | 5 | 1597 (864) |
| 1026 (870) | 2993 (872) | 600 | 6566 | 2393 | | 597 | 748 | 5 | 0.05% (874) | 15 | 11 | 4 | 0 |
| 1027 | 2393 | 630 | 7196 | 1763 | | 600 | 798 | -36 | -0.34% | 15 | 12 | 3 | 0 |
| 1028 | 1763 | 640 | 7836 | 1123 | | 603 | 882 | -83 | -0.78% | 15 | 13 | 2 | 0 |
| 1029 | 1123 | 635 | 8471 | 488 | | 605 | 1123 | -117 | -1.11% | 15 | 14 | 1 | 0 |
| 1030 | 488 | 640 | 9111 | (152) | | 607 | | -152 | -1.44% | 15 | 15 | 0 | 0 |

METHOD AND DEVICE FOR AUTOMATICALLY MANAGING NETWORK

TECHNICAL FIELD

The present disclosure relates to a method and a device for managing a network in a communication system.

BACKGROUND ART

In order to manage a network element, a network management server may be added for a set of network elements. In this case, it is necessary for a user to intervene in assigning a network management server for every network element. Particularly, when the number of base stations (which may be eNodeBs (eNBs)) is large, it is very important to configure a network management server in order to perform efficient communication. When a network management server is currently configured, every time the cell capacity of a network element is increased, it is required to configure a new network management server. A user is required to manually configure the new network management server, and particularly, data movement and effort are required to move a network element to be managed, from one network management server to another network management server.

As an example, when 10,000 base stations are managed by a single network management server and each base station has three cells, the total number of cells managed is 30,000. When the number of cells is increased to 9, capacity is increased to 300%. Therefore, it is further required to add two management servers. Current technology requires a user to intervene in extension according to an increase in capacity.

DISCLOSURE OF INVENTION

Technical Problem

Since a user is required to manually configure a network management server according to an increase in cell capacity of a network element, it is necessary to automatically configure a network management server. Therefore, the present disclosure provides a method for automatically configuring a network management server by a network system without user intervention.

Solution to Problem

In order to solve the above-mentioned problems, in accordance with an aspect of the present disclosure, there is provided a method for managing a network management server by a load balancer. The method includes: receiving information on addition of a new base station to a network; transmitting information on the new base station to at least one network management server; receiving throughput time information for the new base station from the at least one network management server; and determining a network management server, to which the new base station is to be assigned, on the basis of the throughput time information. Also, the method further includes: receiving load balancing-related information from the at least one network management server; and determining whether load balancing is performed for the at least one network management server on the basis of the load balancing-related information.

Further, in accordance with another aspect of the present disclosure, there is provided a load balancer for managing a network management server. The load balancer includes: a transceiver configured to transmit or receive a signal to or from at least one network management server; a storage unit configured to store data; and a controller configured to control the transceiver to receive information on addition of a new base station to a network, transmit information on the new base station to at least one network management server, and receive throughput time information for the new base station from the at least one network management server, and configured to control such that a network management server, to which the new base station is to be assigned, is determined on the basis of the throughput time information. Also, the controller is configured to: control the transceiver to receive load balancing-related information from the at least one network management server; and further control such that whether load balancing is performed for the at least one network management server is determined on the basis of the load balancing-related information.

Advantageous Effects of Invention

The method for configuring a network management server according to an embodiment of the present disclosure makes it possible to automatically and efficiently manage a network management server without user intervention.

BRIEF DESCRIPTION OF DRAWINGS

FIGS. 8A and 8B are views each illustrating a specific example of load balancing.

MODE FOR THE INVENTION

Figure 1:
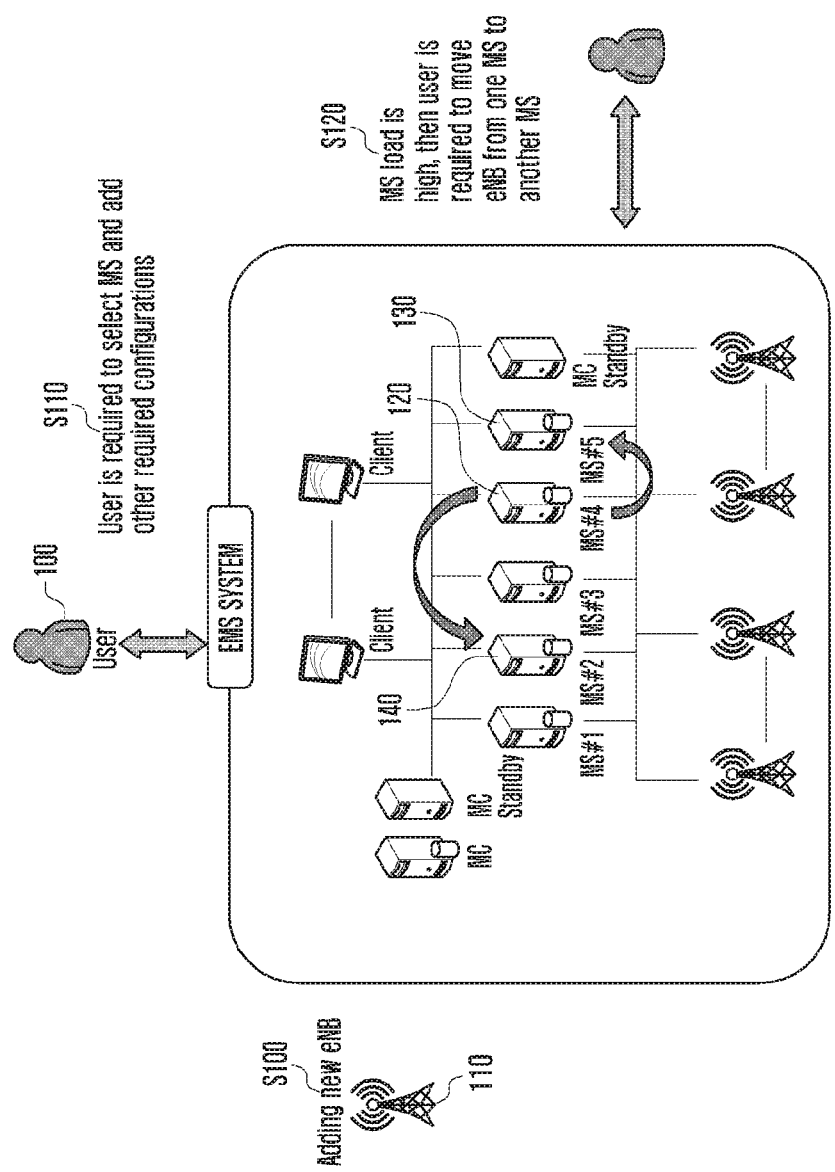
FIG. 1 is a view illustrating a network structure including a current network management server (hereinafter, a network management server may be used interchangeably with an MS).

Hereinafter, embodiments of the present disclosure will be described in detail with reference to the accompanying drawings. Also, in the following description of the present disclosure, a detailed description of known functions and configurations incorporated herein will be omitted when it may unnecessarily obscure the subject matter of the present disclosure. Further, terms described below, which are defined considering functions in the present disclosure, may be different depending on user and operator's intention or practice, etc. Therefore, the terms should be defined based on the disclosure throughout this specification.

In addition, in a detailed description of the embodiments of the present disclosure, the main subject matter of the present disclosure may be applied even to other communication systems having the similar technical background and channel format, with a slight modification, without largely departing from the scope of the present disclosure, and this applicability will be understood based on the determination of those skilled in the art in the technical field of the present disclosure.

The advantages and features of the present disclosure and methods for achieving the same will become clear with reference to the embodiments described below in detail with the accompanying drawings. However, the present disclosure is not limited to the embodiments disclosed below, and may be implemented in various forms; rather, these embodiments are provided so that this disclosure will be thorough and complete, and will fully convey the concept of the disclosure to those having ordinary knowledge in the technical field to which the present disclosure pertains. The present disclosure is only defined by the following claims. Like reference numbers are used to refer to like elements throughout the specification.

Here, it will be understood that each block of the flowchart illustrations, and combinations of blocks in the flowchart illustrations, can be implemented by computer program instructions. These computer program instructions may be loaded onto a processor of a general-purpose computer, special-purpose computer, or other programmable data processing apparatuses and thus the instructions, which are executed by the processor of the computer or other programmable data processing apparatuses, create a means for implementing the functions specified in the flowchart block(s). These computer program instructions may also be stored in a computer-usable or computer-readable memory, which can direct a computer or other programmable data processing apparatuses, in order to implement function in a particular manner and thus the instructions stored in the computer-usable or computer-readable memory can produce an article of manufacture including an instruction means that implement the function specified in the flowchart block(s). Since the computer program instructions may also be loaded onto a computer or other programmable data processing apparatuses, a series of operational steps are performed on the computer or other programmable data processing apparatuses so as to produce a computer-executable process, so that the instructions executed on the computer or other programmable data processing apparatuses can provide steps for implementing the functions specified in the flowchart block(s).

Also, each block of the flowchart illustrations can represent a module, a segment, or a part of a code, which includes one or more executable instructions for implementing the specified logical function(s). It should also be noted that in some alternative embodiments, the functions specified in the blocks may occur out of the order. For example, two blocks shown in succession may in fact be executed substantially concurrently, or the blocks may sometimes be executed in the reverse order, depending on the functions in question.

Here, the term "unit" used in the embodiments refers to a software element or a hardware element, such as a field programmable gate array (FPGA) or an application specific integrated circuit (ASIC), and the "unit" performs a certain function. However, the "unit" does not always have a meaning limited to software or hardware. The "unit" may be configured either to be stored in an addressable storage medium or to reproduce one or more processors. Accordingly, as an example, the "unit" includes elements (e.g., software elements, object-oriented software elements, class elements, and task elements), processors, functions, attributes, procedures, subroutines, segments of a program code, drivers, drivers, firmware, micro-codes, circuits, data, databases, data structures, tables, arrays, and variables. The elements and the functions provided by the "units" may be either combined into a smaller number of elements and "units", or further divided into additional elements or "units". Moreover, the elements or "units" may be implemented to reproduce one or more CPUs within a device or a security multimedia card.

According to the present disclosure, when new network elements or cell capacity is increased or decreased in a network, a new virtual management server may be automatically added to or removed from a background on the basis of a primary management server operational efficiency key performance indicator (KPI). The virtual management server may monitor a network without moving a network element to another server or reducing or increasing the number of base stations, and may replace a primary management server that a user can currently interact with or operate. Through the virtual management server, the cell capacity of a network may be increased without reducing or increasing the number of base stations in connection with another management server or moving a base station to another management server. User intervention is never required for management execution of the virtual management server, and a system automatically performs a management operation of the virtual management server on the basis of self-learning KPI-based operational efficiency.

FIG. 1 is a view illustrating a network structure including a current network management server (hereinafter, a network management server may be used interchangeably with an MS).

Referring to FIG. 1, a communication network element management system (EMS) may include a client, a master controller (MC), and MSs 120, 130, and 140. The client provides functions of various interfaces (e.g., a graphical user interface (GUI)) for network management and operation, the MC is a server configured to integrally manage the MSs, and each MS provides a base station interface and is a server configured to manage a base station.

In the present example, when a new base station 110 is added to a network in operation S100, in operation S120, a user needs to select, in person, an MS and needs to add a required configuration. In operation S120, when the load of the MS becomes large, the user needs to manually move a particular base station from the MS, which currently manages the particular base station, to another MS.

Figure 2:
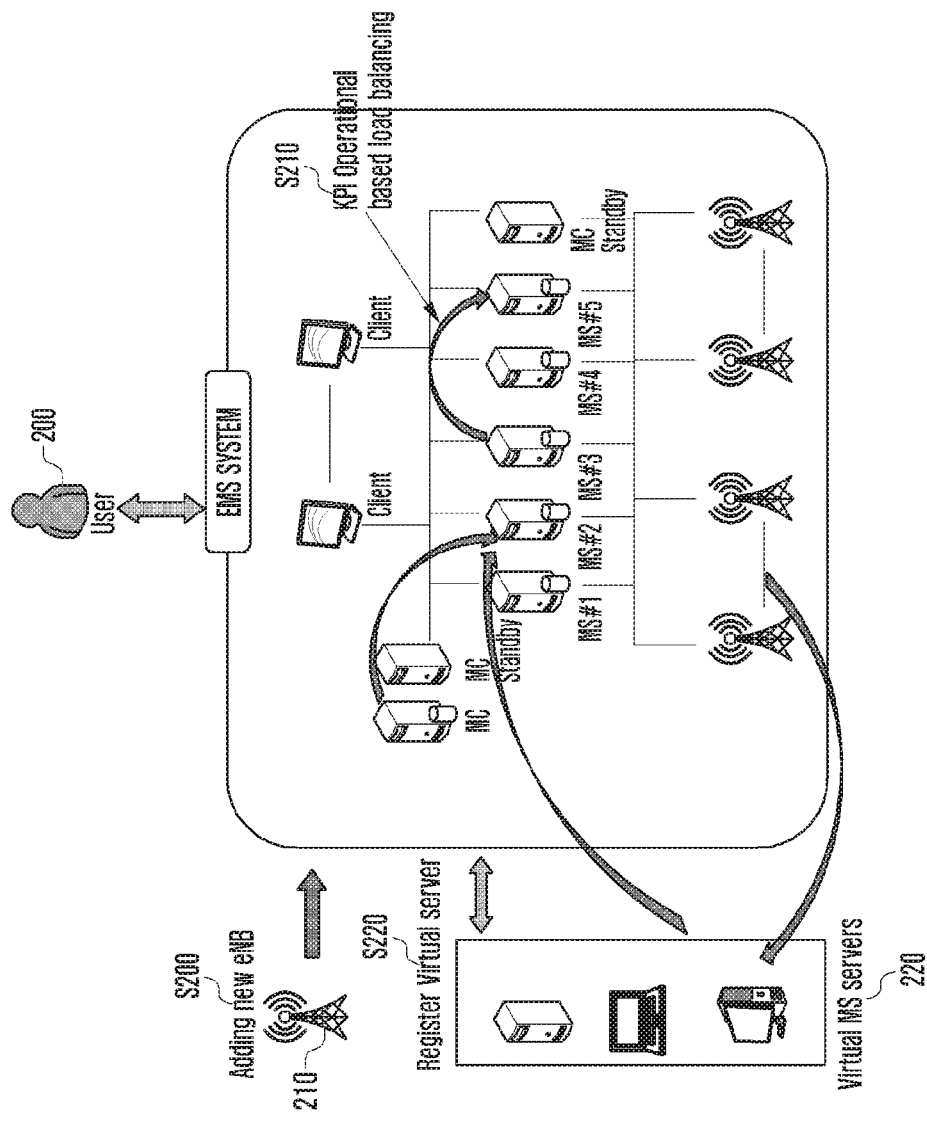
FIG. 2 is a view illustrating a network structure including an MS according to the present disclosure.

FIG. 2 is a view illustrating a network structure including an MS according to the present disclosure.

Referring to FIG. 2, as in FIG. 1, an EMS may include a client, an MC, and MSs. In the present example, each MS may not exist as a server which manages multiple base stations as in FIG. 1, but may exist as a virtual server (a virtual MS 220). The virtual server is a server or computer which can perform the same service as a service performed by each MS of FIG. 1, and may be a personal computer, or other systems or a cloud which can support a function of an MS.

When a new base station 210 is added to a network in operation S200, in operation S210, operational efficiency KPI-based load balancing is performed. As a result, in operation S220, the virtual server may be registered in the network.

The features of the present disclosure according to a system of FIG. 2 are described below. When a base station is added to the network or the cell capacity of a base station is increased, according to an operational efficiency KPI, that is, in such a manner as to maximize operational efficiency, the system (a separate load balancer or network management server) automatically determines a network management server which is to perform a work according to the added base station or the increased cell capacity. A user does not need to select, in person, a network management server in order to add a base station. The network management server may be a virtual server. Also, according to the present disclosure, even when a base station is removed from the network or cell capacity is reduced, in such a manner as to maximize operational efficiency, the remaining work may be re-assigned among the respective network management servers.

According to the present disclosure, even when the user does not change a connection of a base station with a network management server, the system may always add a predetermined number of virtual servers. Accordingly, the system may assign work among management servers or virtual servers, which can support a service, as the need arises and may flexibly expand or manage a network management server and a work of a network management server, according to an operational efficiency KPI. The user does not need to change, in person, a configuration in order to increase or reduce the capacity.

In the following description, a specific network management method according to the present disclosure will be disclosed.

Firstly, a method for selecting a network management server (or a server node) which is optimal for a base station will be described.

When a base station is added to a network, a load balancer selects server nodes, which can monitor network performance statistical data of a server node, in such a manner as to check a communication time between the base station and the server node, locations of the base station and the server node, a current server load, and the like, and determines a server node optimal for the base station among the selected server nodes. The load balancer may store the order of server nodes related to the added base station. As an example, when a first server node has a sufficiently large load, a second server node may be assigned for the added base station. In order to achieve high operational efficiency, such information may be maintained by the load balancer.

Figure 3:
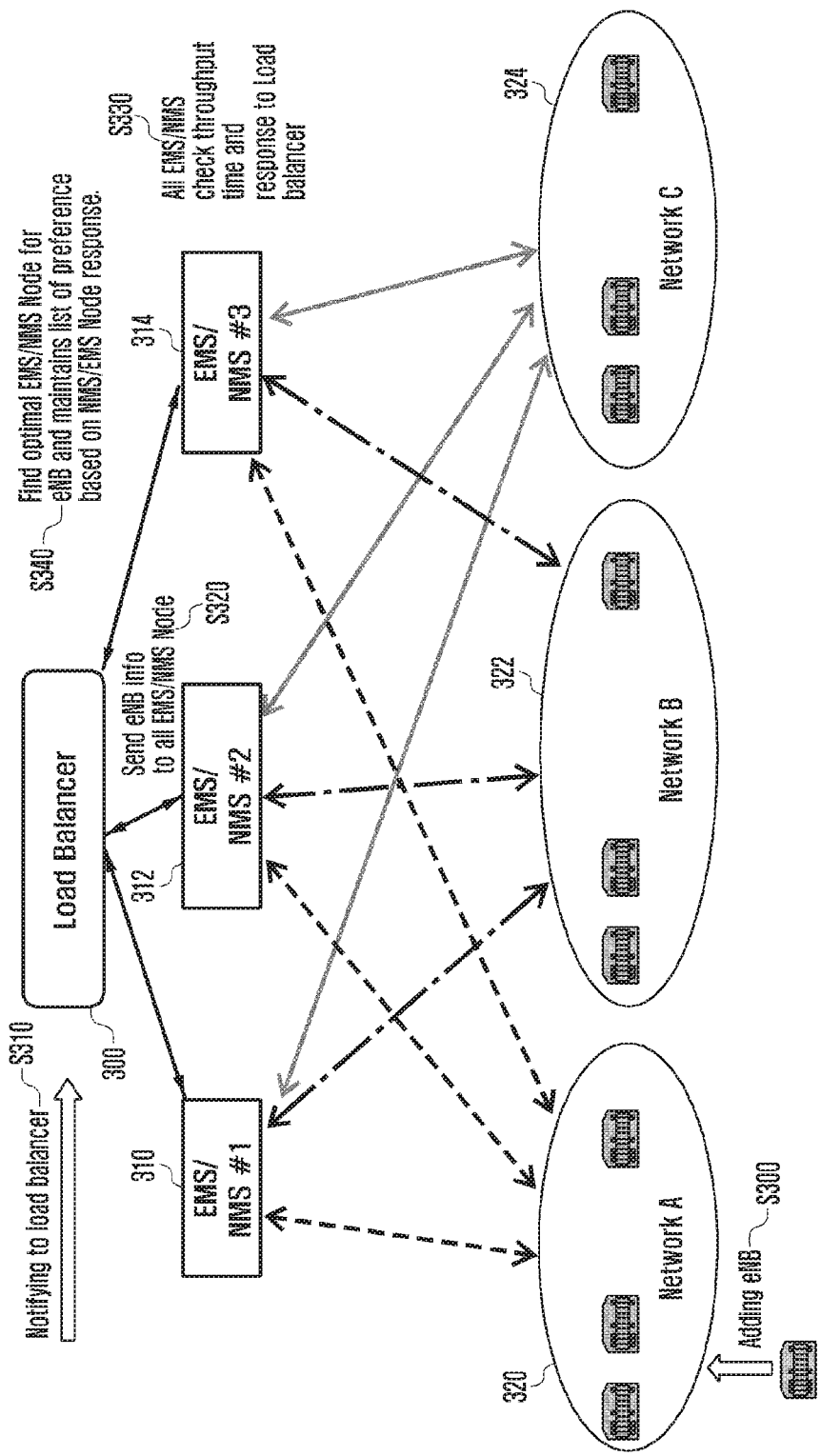
FIG. 3 is a view illustrating a network for selecting an optimal network management server according to the present disclosure.

FIG. 3 is a view illustrating a network for selecting an optimal network management server according to the present disclosure. Referring to FIG. 3, the network includes: a load balancer 300; a network A 320, a network B 322, and a network C 324, each of which may include multiple base stations and network elements; and multiple server nodes (a first server node 310, a second server node 312, and a third server node 314 which may be an EMS or a network management system (NMS)) which can manage the networks 320, 322, and 324. When a base station is added to the network in operation S300, in operation S310, the load balancer is notified of the addition of the base station to the network, and in operation S320, the load balancer notifies all the server nodes of such information (information on the added base station). In operation S330, each of all the server nodes checks a throughput time, and then transmits the checked throughput time as a response to the load balancer. Then, in operation S340, on the basis of the response, the load balancer selects an optimal server node and maintains a preference list.

Figure 4:
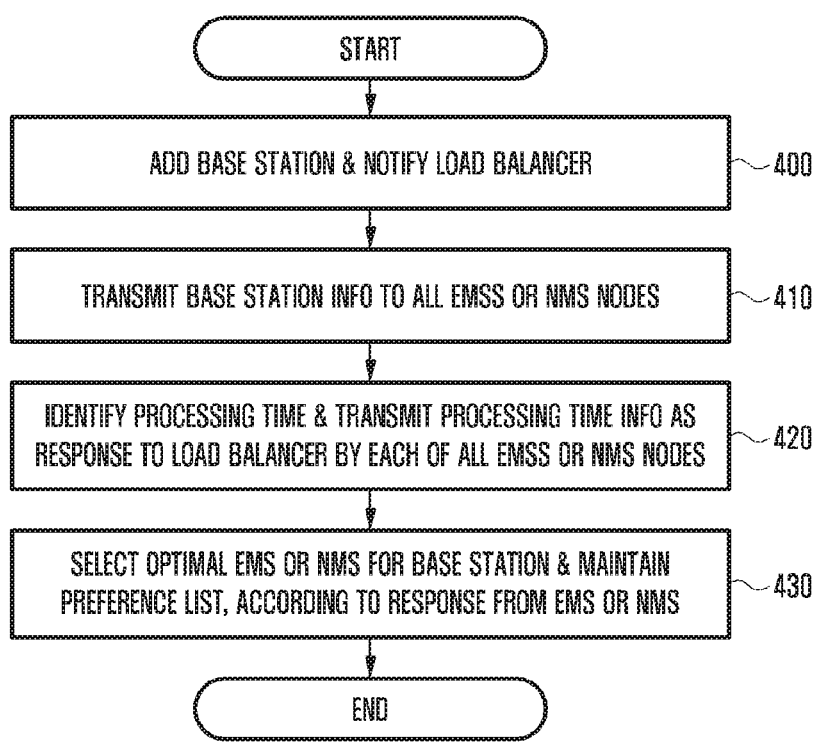
FIG. 4 is a flowchart illustrating a method for selecting an optimal network management server according to the present disclosure.

FIG. 4 is a flowchart illustrating a method for selecting an optimal network management server according to the present disclosure. Hereinafter, a specific embodiment in which the method of FIG. 4 is performed in the network of FIG. 3 will be described.

When a new base station 330 is added to the network, in operation 400, the load balancer 300 is notified of the fact that the new base station is added to the network. In operation 410, in order to check a management work processing time (i.e., a time required for communication between a base station and a server node) of each base station, the load balancer 300 transmits information on the new base station to all neighboring server nodes. In operation 420, each server node receives the information, identifies a processing time, and transmits information on the checked processing time to the load balancer.

As an example, a network-specific processing time of each server node may be shown as follows.

TABLE 1

|  | Network A | Network B | Network C |
|---|---|---|---|
| First server node | T | 2T | 3T |
| Second server node | 2T | T | 2T |
| Third server node | 3T | 2T | T |

When the new base station 330 is added to the network A 320, as a processing time required for the new base station per server node, the first server node has T, the second server node has 2T, and the third server node has 3T.

Then, in operation 430, on the basis of such processing time information, the load balancer selects an optimal server node and assigns the new base station to the optimal server node so as to manage the same, and stores the processing time information. In FIG. 3, a server node which can most rapidly process the new base station of network A is the first server node, and thus assigns the new base station to the first server node.

When the optimal server node already has a sufficiently large load, the load balancer stores and maintains the order of server nodes related to each base station, and assigns the base station to a next optimal server node with reference to processing time values. Specifically, in FIG. 3, the new base station is first assigned to the first server node, and is assigned to the second server node, which is a next best server node, when the first server node already has a sufficiently large load. Also, such processing time information may be used for load balancing.

As an example, consideration is given to a case in which loads of networks are shown as in Table 2 below.

TABLE 2

| Network | Number of networks |
|---|---|
| Network A | 10,000 |
| Network B | 10,000 |
| Network C | 10,000 |

In the present example, load balancing distribution according to the present disclosure may be generated as shown in Table 3 below.

TABLE 3

|  | Network A | Network B | Network C |
|---|---|---|---|
| First server node | 10000 | 0 | 0 |
| Second server node | 0 | 10000 | 0 |
| Third server node | 0 | 0 | 10000 |

Processing time distribution in each server node is shown in Table 4 below.

TABLE 4

|  | Network A | Network B | Network C | Sum (CT) |
|---|---|---|---|---|
| First server node | 10000T | 0T | 0T | 10000T |
| Second server node | 0T | 10000T | 0T | 10000T |
| Third server node | 0T | 0T | 10000T | 10000T |

When: a total time required for communication during each interval is denoted by CT; a parsing time of a file needed to manage one base station in each server node is denoted by P; and the total number of base stations per node is denoted by N, a total processing time S for performance statistical data in one interval period S may become a time obtained by adding a time required for communication with a base station and a parsing time of base station data. That is, the total processing time S may be defined by Equation 1 below.

$$S = N \times P + CT \qquad \text{Equation 1}$$

As an example, when N is 10000, S may be 10,000 P+CT. A total processing time S for network A in the first server node is 10000 P+10000T.

In the present example, in the method for selecting a server node according to the present disclosure, compared with an existing scheme for managing, by a server node, a base station of each network regardless of a processing time (e.g., each server node may manage one third of base stations of networks A, B, and C), CT is improved by 50% compared with the existing scheme (CT=20000T) as to the first server node, CT is improved by 39% compared with the existing scheme (CT=16500T) as to the second server node, and CT is improved by 51% compared with the existing scheme (CT=20500T) as to the third server node.

Secondly, a method for calculating operational efficiency and managing a load will be described.

After a base station is added as a subject to be managed by a server node, the server node may calculate operational its own efficiency, and may transmit detailed information to a load balancer. On the basis of the detailed information, if necessary, the server node or a load balancer may determine load balancing and may perform load balancing.

Figure 5:
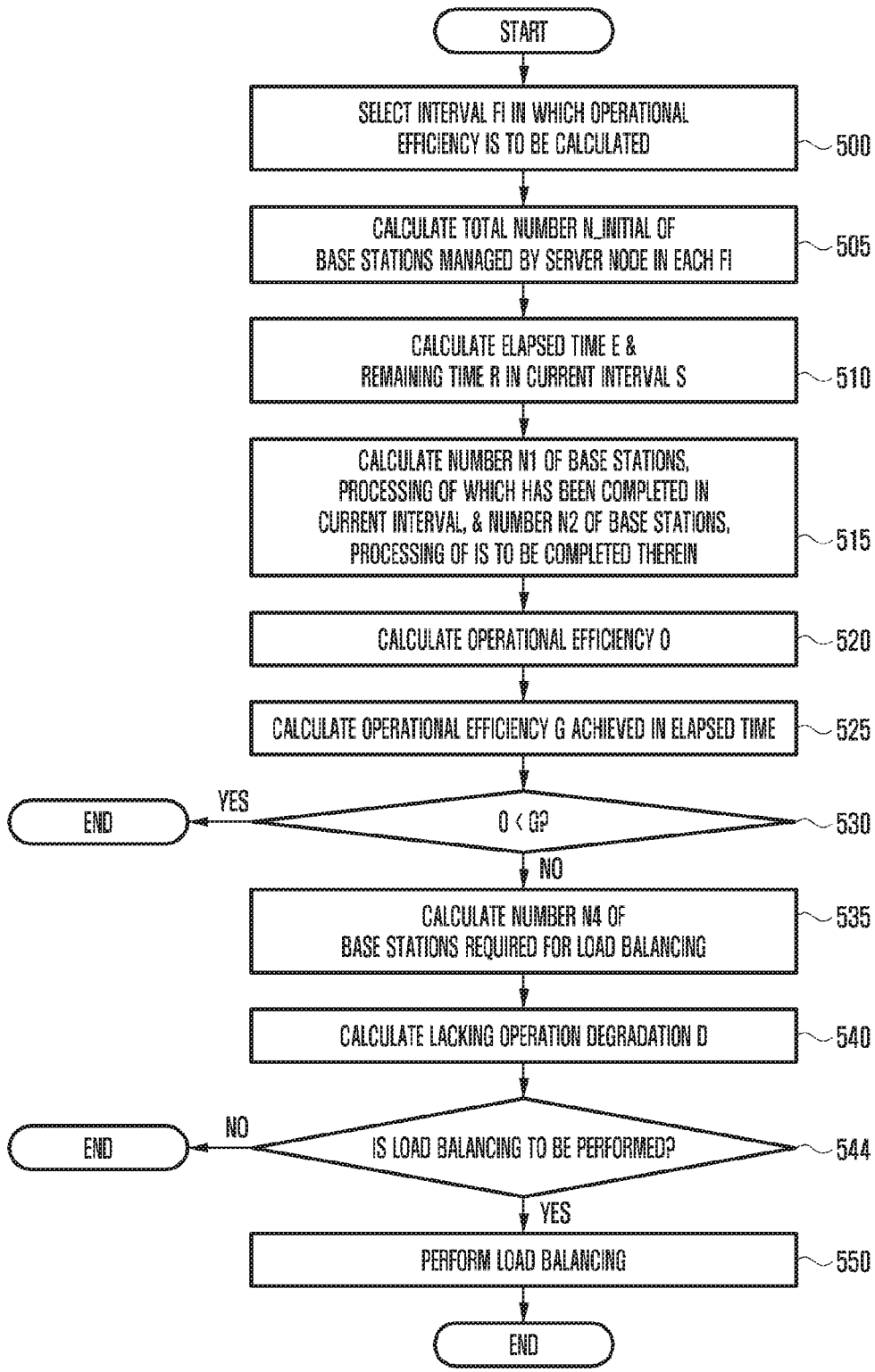
FIG. 5 is a flowchart illustrating a method for calculating operational efficiency.

FIG. 5 is a flowchart illustrating a method for calculating operational efficiency.

Referring to FIG. 5, in operation 500, a server node determines a fixed interval (FI) during which operational efficiency is to be calculated. The FI may be determined by the load balancer or a network, or may depend on a predetermined value. In operation 505, whenever an FI is started, the server node calculates the total number N_initial of base stations managed by the server node. N_initial represents the sum of the total number of base stations, managed by the server node, and N3 representing the number of base stations in the previous interval, the processing of which is not completed during the previous FI and is passed to a current FI. Then, in operation 510, the server node calculates an elapsed time E and a remaining time R in an FI with reference to the present. In the present example, E+R=FI may be defined. In operation 515, the server node calculates the number N1 of base stations, the processing of which has already been completed during the current FI, and the number N2 of base stations, the processing of which is not completed during the current FI. In the present example, N_initial is N1+N2.

Also, the server node may perform the base station processing procedure, and when the load of at least one of a system CPU and memory of the server node becomes larger than a predetermined threshold, the server node may check the load of the memory or CPU of the server node, and then may reduce, by 5%, the number of base stations to be simultaneously processed. 5% is an example of a numerical value, and the server node may adjust a numerical value used to reduce the number of base stations to be simultaneously processed. Until a system becomes normal, that is, the load of the system CPU or memory becomes smaller than the predetermined threshold, the server node repeats this operation. When the system returns to a normal state, the server node proceeds to the next operation. This procedure may affect operational efficiency.

In operation 520, the server node calculates operational efficiency O, which needs to be achieved for a remaining time, by Equation 2 below.

$$O = N/R \qquad \text{Equation 2}$$

In the present example, R may be expressed in minutes. N represents the number of base stations which are not processed and thus remain, and which need to be monitored by the server node at the present time (i.e., may become the value of N2 in the time unit elapsed). Then, the server node calculates operational efficiency G, which has already been achieved in the elapsed time, by using Equation 3 below.

$$G = N1/E \qquad \text{Equation 3}$$

In the present example, E may be expressed in minutes. G is obtained by dividing the number of base stations, the processing of which has already been completed, by an elapsed time, and may be regarded as efficiency in the elapsed time.

Load balancing-related information including FI, E, R, N, N1, N2, N3, O, and G may be calculated by the server node and may be delivered to the load balancer, or some pieces of information may be delivered to the load balancer and the load balancing-related information may be calculated by the load balancer. In operation 530, the server node or the load balancer determines whether G is larger than O. When G representing achieved operational efficiency is larger than O representing operational efficiency which needs to be achieved, the server node or the load balancer does not need to perform load balancing. If not, the server node or the load balancer needs to perform load balancing as described below.

In operation 535, when load balancing needs to be performed, the server node or the load balancer calculates the number N4 of base stations required for load balancing, by using Equation 4 below.

$$N4 = N\_initial - (N1 + (G \times R)) = N2 - G \times R \qquad \text{Equation 4}$$

N_initial represents the total number of base stations which need to be processed during this FI, N1+(G×R) represents the number of base stations, which have already been processed, and the number of base stations, which can be processed for a remaining time, and N4 represents the number of base stations which need to be processed by another server node in order to perform load balancing.

Then, the server node or the load balancer calculates a lacking operation degradation D by using Equation 5 below.

$$D = N4/N\_initial \times 100 \qquad \text{Equation 5}$$

A lacking operation degradation D is calculated in percentages. In operation 544, the server node or the load balancer determines whether load balancing is performed, on the basis of a D value. Also, the server node or the load balancer may determine whether load balancing is performed, in consideration of D values in multiple FIs. This configuration can prevent undesired load balancing. As an example, when D values of multiple intervals are considered, a load exists in only one interval and the remaining intervals are normal, load balancing may not be performed. In operation 550, when a continuous load appears in an FI, the load balancer performs load balancing.

When load balancing is performed and thus D is adjusted, the server node observes the next FI, and updates the number of base stations, the processing of which has not been completed in the previous FI, to N2. The server node transmits, to the load balancer, information on the number N4 (the number of base stations for which load balancing is to be performed) of base stations which are not monitored in a base station list. In the present example, N4 base stations are excluded from a processing list of the server node, and then, another server node processes the N4 base stations. Accordingly, a value of N1+N2 is obtained by subtracting N4, for which load balancing is performed, from the value of N_initial (specifically, as many base stations as N4 can be subtracted from N1). Then, the server node may reconfigure 0's in a load balancing list having a size of N4.

The above operations are repeated in every interval during which the above-described procedure is configured. The configured interval is an interval existing in an FI, and may be one minute or any set value from 1 to S.

Hereinafter, in a specific embodiment, a method for calculating operational efficiency will be described.

Figure 6:
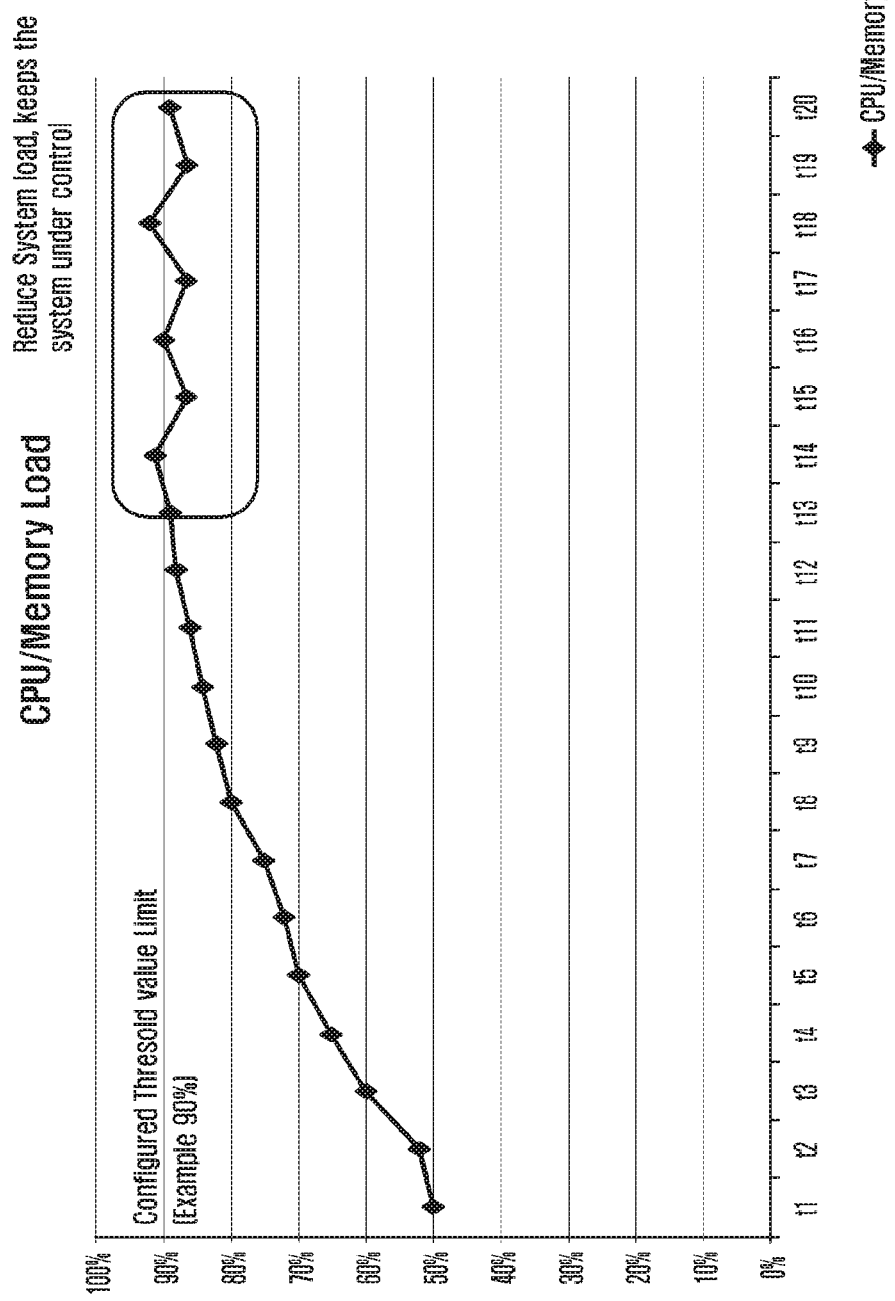
FIG. 6 is a view illustrating a case in which the load of a system central processing unit (CPU) and/or memory is adjusted when the load thereof exceeds a predetermined threshold.

FIG. 6 is a view illustrating a case in which the load of a system CPU and/or memory is adjusted when the load thereof exceeds a predetermined threshold. Referring to FIG. 6, a predetermined threshold is 90% (this configuration is only an example), and when the load of the system CPU and/or memory exceeds 90%, a system adjusts the load and maintains the balance and stability thereof. In the present example, a server node may send, to a load balancer, a request for load balancing.

Figure 7:
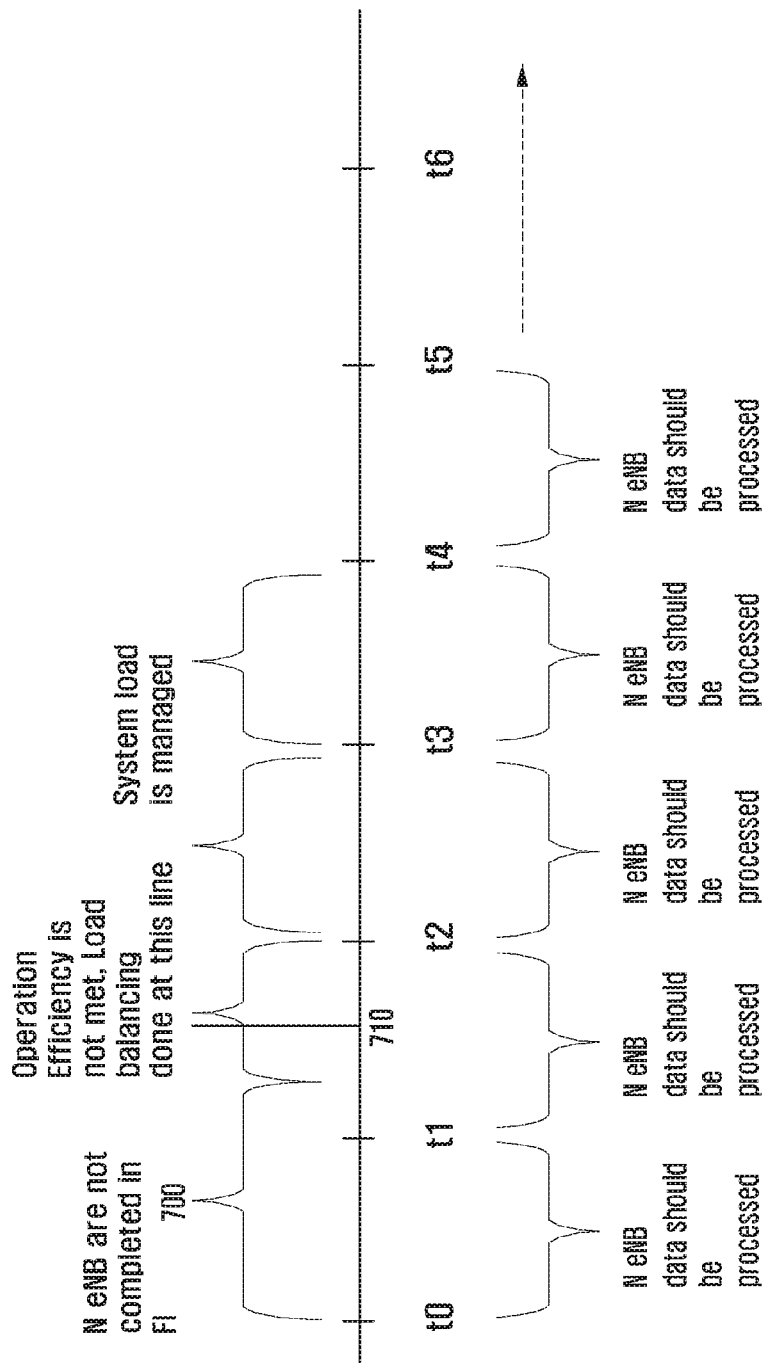
FIG. 7 is a view illustrating an example of load balancing.

FIG. 7 is a view illustrating an example of load balancing. Referring to FIG. 7, a fixed interval FI is t1 to t0 700, and data of N eNBs needs to be all processed in the fixed interval. However, when the N eNBs are not actually processed (i.e., when an operational degradation is checked), load balancing is performed (as indicated by reference numeral 710). In the present example, when an operational degradation is higher than a set threshold, load balancing is performed. Thereafter, in an interval t2 to t3 and in an interval t3 to t4, a system load is adjusted and thus the data of the N eNBs may be processed in the fixed interval.

FIGS. 8A and 8B are views each illustrating a specific example of load balancing. Referring to FIG. 8A, a fixed interval FI is 15 minutes and the number N of base stations, which need to be processed per fixed interval, is 10,000. In the present example, the number N3 of eNBs, which are not processed in the previous interval, is 0 and thus N_initial of a fixed interval 1 800 becomes 10,000. As data of a base station is processed at every one minute, the number N1 of base stations, the processing of which has been completed, is increased and the number N2 of base stations, the processing of which is not completed, is reduced, so that N1+N2 becomes 10,000.

At 10:15 o'clock 810, a fixed interval is terminated, but at this time, the number N2 812 of base stations, the processing of which is not completed, becomes 556. In the present example, N3 (the number of base stations in the previous fixed interval, the processing of which has not been completed in the previous fixed interval and is left to a current fixed interval) of a next fixed interval, becomes 556.

In a fixed interval 2 850, N_initial becomes 10,000+ 556=10,556. Thereafter, as data of a base station is processed at every one minute, the number N1 of base stations, the processing of which has been completed, is increased, and the number N2 of base stations, the processing of which is not completed, is reduced, so that N1+N2 becomes 10,556. Then, by using the method of FIG. 5, the server node or the load balancer calculates operational efficiency O which needs to be achieved, operational efficiency G which has already been achieved, and the number N4 of base stations which are required for load balancing, and finally calculates an operation degradation D. When consideration is given to a case in which a threshold of D is set to 15%, if an operational degradation D is higher than or equal to 15% (as indicated by reference numeral 862) at 10:25 o'clock 860, load balancing is performed. In the present example, load balancing is performed for 1597 base stations (as indicated by reference numeral 864), and then an N1 value 872 becomes a value obtained by subtracting the number of base stations for which load balancing is performed. Thereafter, the operation degradation D becomes lower than or equal to 15% (as indicated by reference numeral 874). That is, a system load becomes normal.

Referring to FIGS. 8A and 8B, a system becomes overloaded on and after 10:01 o'clock, but in order to avoid undesired load balancing, checks an operation degradation and determines optimal time at which load balancing is to be performed, on the basis of a determination as to whether the operation degradation exceeds a threshold.

Figure 9:
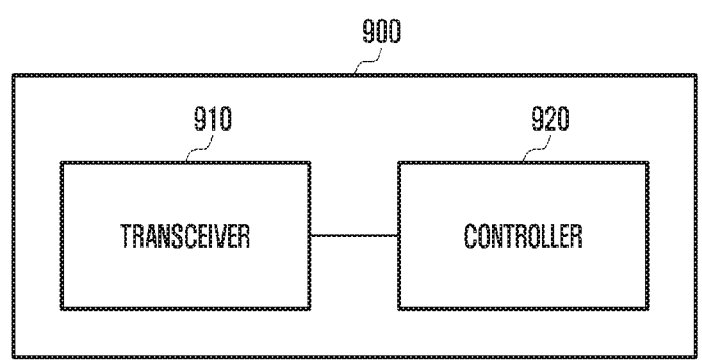
FIG. 9 is a block diagram illustrating a configuration of a base station.

FIG. 9 is a block diagram illustrating a configuration of a base station.

Referring to FIG. 9, the base station 900 may include a transceiver 910 and a controller 920. According to an embodiment of the present disclosure, the transceiver 910 is configured to perform transmission/reception of data and control information between the base station and a network management server (or a server node), and the controller 920 is configured to control the above-described operation.

Figure 10:
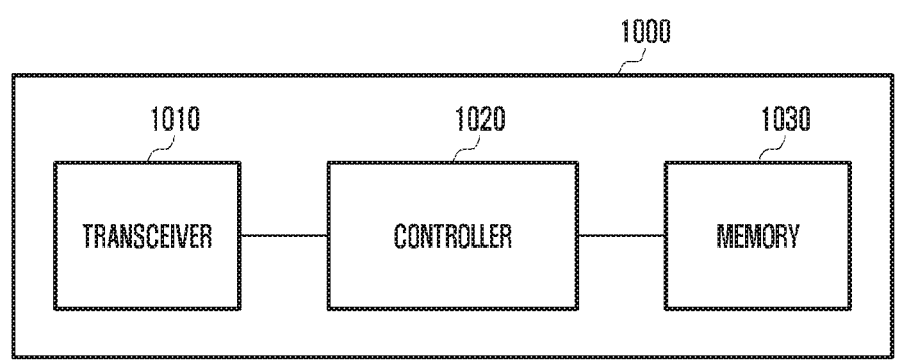
FIG. 10 is a block diagram illustrating a configuration of a network management server (or a server node) or a load balancer.

FIG. 10 is a block diagram illustrating a configuration of a network management server (or a server node) or a load balancer.

Referring to FIG. 10, the network management server (or the server node) or the load balancer may include a transceiver 1010, a controller 1020, and a storage unit 1030. The transceiver 1010 of the network management server is configured to transmit or receive data and control information to or from a base station, and the controller 1020 is configured to control the above-described operation. Also, the storage unit 1030 may be configured to store data on the base station. Further, the controller 1020 may be configured to calculate a base station-specific (or network-specific) processing time, and perform load balancing-related calculation. Specifically, the controller 1020 may be configured to perform the procedure illustrated in FIG. 5. The transceiver 1010 may be configured to transmit such processing time information to the load balancer, and calculate a load balancing-related value and notify the load balancer of the load balancing-related value. The storage unit 1030 may be configured to store data to be transmitted or received.

When a new base station is added to a network, the controller 1020 of the load balancer may be configured to control the transceiver 1010 to transmit information on the new base station to the network management server. Also, the controller 1020 of the load balancer may be configured to determine an optimal network management server for the base station, on the basis of a communication time between the base station and the network management server, the location of the network management server, the current load of a network management apparatus, and the like. Further, the controller 1020 of the load balancer may be configured to receive an operational efficiency-related value from the network management server and determine whether load balancing is to be performed, on the basis of the operational efficiency-related value. Specifically, the controller may be configured to directly perform calculation according to the embodiment of FIG. 5 or receive, from the network management server, a parameter according to the embodiment of FIG. 5 and determine whether load balancing is to be performed, on the basis of the parameter. The transceiver 1010 may be configured to receive the information from the network management server and notify the network management server of whether load balancing is performed and the number of base stations which need to be distributed. Also, the storage unit 1030 may be configured to store information and a parameter to be transmitted or received.

According to the present disclosure, when a base station is added or the capacity of a network element is increased, user intervention is not required and a system is automatically processed, so that the loss of data can be prevented. Also, user intervention is not required, so that operational costs can be reduced and resources can be efficiently utilized due to self-elasticity.

The invention claimed is:

1. A method for managing a network management server by an apparatus for load balancing, the method comprising:
    receiving information indicating that a new base station is added to a network;
    transmitting the information to at least one network management server;
    receiving, from the at least one network management server, processing time information indicating a communication time between the new base station and the at least one network management server and load balancing-related information including an operation degradation ratio of the at least one network management server;
    determining the network management server, to which the new base station is to be assigned based on the processing time information; and
    determining whether the load balancing is performed for the at least one network management server based on the load balancing-related information,
    wherein the load balancing is determined to be performed based on a result of a comparison between the operation degradation ratio and a predetermined threshold, and
    wherein the operation degradation ratio is determined as a ratio of a number of base stations, which one network management server needs to process in a fixed interval, to the number of base stations required for the load balancing in the fixed interval.

2. The method of claim 1, wherein the number of base stations required for the load balancing corresponds to a number obtained by subtracting the number of base stations, which has already been processed, and the number of base stations, which are capable of being processed for a remaining time in the fixed interval, from the number of base stations which the one network management server needs to process.

3. The method of claim 1, wherein the load balancing is determined to be performed in a case that the operation degradation ratio exceeds the predetermined threshold during multiple time intervals.

4. The method of claim 1, further comprising, in a case that at least one load among each central processing unit (CPU) and memory of the at least one network management server exceeds a predetermined threshold, receiving a load balancing request from the at least one network management server.

5. An apparatus for load balancing for managing a network management server, the apparatus comprising:
    a transceiver;
    a storage unit configured to store data; and
    a controller configured to:
    receive information indicating that a new base station is added to a network,
    transmit the information to at least one network management server,
    receive, from the at least one network management server, processing time information indicating a communication time between the new base station and the at least one network management server and load balancing-related information including an operation degradation ratio of the at least one network management server,
    determine the network management server, to which the new base station is to be assigned based on the processing time information, and
    determine whether the load balancing is performed for the at least one network management server based on the load balancing-related information,
    wherein the load balancing is determined to be performed based on a result of a comparison between the operation degradation ratio and a predetermined threshold, and
    wherein the operation degradation ratio is determined as a ratio of a number of base stations, which one network management server needs to process in a fixed interval, to the number of base stations required for the load balancing in the fixed interval.

6. The apparatus of claim 5, wherein the number of base stations required for the load balancing corresponds to a number obtained by subtracting the number of base stations, which has already been processed, and the number of base stations, which are capable of being processed for a remaining time in the fixed interval, from the number of base stations which the network management server needs to process.

7. The apparatus of claim 5, wherein the load balancing is determined to be performed in a case that the operation degradation ratio exceeds the predetermined threshold during multiple time intervals.

8. The apparatus of claim 5, further comprising, in a case that at least one load among each central processing unit (CPU) and memory of the at least one network management server exceeds a predetermined threshold, the controller is configured to receive a load balancing request from the at least one network management server.

* * * * *